US007034997B2

United States Patent
Hwang et al.

(10) Patent No.: US 7,034,997 B2
(45) Date of Patent: Apr. 25, 2006

(54) WIDEBAND OPTICAL FIBER AMPLIFIER

(75) Inventors: Seong-Taek Hwang, Pyongtaek-shi (KR); Yun-Je Oh, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 10/659,157

(22) Filed: Sep. 10, 2003

(65) Prior Publication Data

US 2004/0233516 A1    Nov. 25, 2004

(30) Foreign Application Priority Data

May 20, 2003  (KR) ............... 10-2003-0031969

(51) Int. Cl.
*H01S 3/00* (2006.01)
(52) U.S. Cl. .................................. 359/349
(58) Field of Classification Search ............ 359/349
See application file for complete search history.

(56) References Cited

U.S. PATENT DOCUMENTS

| | | | |
|---|---|---|---|
| 6,437,907 B1 * | 8/2002 | Yoon et al. | 359/341.32 |
| 6,466,363 B1 | 10/2002 | Masum-Thomas et al. | 359/334 |
| 6,621,627 B1 * | 9/2003 | Willner et al. | 359/349 |
| 6,646,796 B1 * | 11/2003 | Song et al. | 359/349 |
| 6,674,570 B1 * | 1/2004 | Song et al. | 359/349 |
| 6,785,043 B1 * | 8/2004 | Hwang et al. | 359/337.5 |
| 6,867,912 B1 * | 3/2005 | Hwang et al. | 359/349 |
| 6,903,868 B1 * | 6/2005 | Hwang et al. | 359/349 |
| 6,927,898 B1 * | 8/2005 | Yeniay et al. | 359/349 |

FOREIGN PATENT DOCUMENTS

EP        0883218 A1    12/1998
WO     WO 02/061987       8/2002

* cited by examiner

*Primary Examiner*—Deandra M. Hughes
(74) *Attorney, Agent, or Firm*—Cha & Reiter, L.L.C.

(57) ABSTRACT

The wideband optical fiber optical includes a circulator. In addition the amplifier outputs the amplified spontaneous emission (ASE) and the S-band optical signals. At least one optical fiber grating is used for passing the C- and L-band optical signals. A wavelength selective splitter outputs the L-band optical signal. A first optical fiber amplifying unit connected with the optical fiber grating and the first port of the wavelength selective splitter, for amplifying the C- and L-band optical signals and for outputting the ASE to the optical fiber grating. A second optical fiber amplifying unit for amplifying the L-band optical signals inputted from the second port of the wavelength selective splitter and for outputting the amplified L-band optical signals to the third terminal of the outputting unit. A third optical fiber amplifying unit amplifies the S-band optical signals input from the third port of the circulator, and outputs the amplified S-band optical signals to the first terminal of the outputting unit.

14 Claims, 3 Drawing Sheets

WIDEBAND OPTICAL FIBER AMPLIFIER

CLAIM OF PRIORITY

This application claims priority to an application entitled "Wideband Optical Fiber Amplifier," filed in the Korean Intellectual Property Office on May 20, 2003 and assigned Ser. No. 2003-31969, the contents of which are hereby incorporated by reference.

BACKGROUND OF THE INVENTION

1. Field of the Invention

The present invention relates to an optical fiber amplifier. More particularly, the present invention relates to a wideband optical fiber amplifier having an optical fiber doped with a rare earth element, thereby having a capability to amplify optical signals having a wide wavelength band.

2. Description of the Related Art

Wavelength division multiplexing (WDM) is a technique that allows for increases in transmission capacity per optical fiber. The increase in capacity is due to transmitting and receiving a plurality of channels, which are multi-divided to have different wavelengths, through a single optical fiber. Optical communication networks employing the foregoing WDM technique generally make use of C-band or L-band optical signals, in which the C-band has a wavelength band from 1530 nm to 1560 nm, while the L-band has a wavelength band from 1570 nm to 1600 nm. However, due to a sharp increase in communication demands in recently, there have been proposals made with regard to securing a more efficient communication network. More specifically, there had been a proposal to expand a wavelength band of optical signals up to an S-band ranging from 1450 nm to 1500 nm to permit the use of the expanded wavelength band of optical signals.

For the optical communication networks employing the foregoing WDM technique, a wideband optical fiber amplifier is commonly used including an optical fiber doped with various rare earth elements, each of which allows optical signals having different wavelength bands to be amplified. The rare earth elements are exemplified by Erbium, Thulium or the like, ions of which are used for amplification. In particular, ions of Thulium are suitable for amplification of S-band optical signals, which ions of Erbium have difficulty in amplifying.

FIG. 1 shows a prior art configuration of a wideband optical amplifier. According to this prior art, there are a plurality of amplifying units that are arranged in parallel. As shown in FIG. 1, the conventional wideband optical amplifier includes a wavelength band splitting unit 140 for splitting optical signals inputted outside based on each respective wavelength band, wherein a first optical fiber amplifying unit 110 amplifies C-band optical signals. A second optical fiber amplifying unit 120 amplifies L-band optical signals. A third optical fiber amplifying unit 130 amplifies S-band optical signals, and an outputting unit 150 outputs respective amplified optical signals to a single terminal. The C-band optical signals refer to ones having a wavelength ranging from 1530 nm to 1560 nm, the L-band optical signals refer to ones having a wavelength range from 1570 nm to ing1600 nm, and the S-band optical signals refer to ones having a wavelength range from 1450 nm to 1500 nm.

The wavelength band splitting unit 140 divides optical signals inputted into a first terminal into C-band ones, L-band ones and S-band ones Subsequently, the wavelength band splitting unit outputs the C-band, the L-band and the S-band optical signals through second, third and fourth terminals to the respective optical fiber amplifying units. The wavelength band splitting unit 140 includes a sixth wavelength selective coupler 141, a seventh wavelength selective coupler 142, a first isolator 143, a second isolator 144, and a third isolator 145.

The sixth wavelength selective coupler 141 has three ports, of which a first port is connected to the first terminal of the wavelength band splitting unit 140. A second port is connected to the seventh wavelength selective coupler 142, and a third port is connected to the third isolator 145. Accordingly, among optical signals inputted into the first port, the C-band and L-band optical signals are allowed to be outputted to the second port, while the S-band optical signals are allowed to be outputted to the third port.

The seventh wavelength selective coupler 142 has also three ports, of which a first port is connected to the second port of the sixth wavelength selective coupler 141; a second port is connected to the first isolator 143, and a third port is connected to the second isolator 144. Among the C-band and L-band optical signals inputted into the first port of the seventh wavelength selective coupler 142, the C-band optical signals are allowed to be outputted to the second port of the seventh wavelength selective coupler 142, while the L-band optical signals are allowed to be outputted to the third port of the seventh wavelength selective coupler 142.

The first isolator 143 outputs the C-band optical signals, which are outputted from the second port of the seventh wavelength selective coupler 142, to the second terminal of the wavelength band splitting unit 140. However, the first isolator 143 isolates optical signals traveling from the second terminal of the wavelength band splitting unit 140 to the first isolator 143.

The second isolator 144 outputs the L-band optical signals, which are outputted from the third port of the seventh wavelength selective coupler 142, to the third terminal of the wavelength band splitting unit 140. However, the second isolator isolates optical signals traveling from the third terminal of the wavelength band splitting unit 140 to the second isolator 144.

The third isolator 145 outputs the S-band optical signals, which can rang from the third port of the sixth wavelength selective coupler 141, to the fourth terminal of the wavelength band splitting unit 140. However, the third isolator 145 isolates optical signals traveling from the fourth terminal of the wavelength band splitting unit 140 to the third isolator 145.

However, the conventional wavelength band splitting unit has a problem in that it makes use of too many components in order to divide optical signals based on each wavelength band, so that insertion loss of the optical signals is increased before the optical signals are inputted into respective optical fiber amplifying units. The insertion loss means the loss of the entire optical power generated while optical signals pass through a plurality of components, and such insertion loss acts as a factor in deteriorating a noise figure of the wideband optical fiber amplifier.

The outputting unit 150 outputs the S-, C- and L-band optical signals are each outputted from the first and third optical fiber amplifying units 110, 120 and 130 to an exterior through one terminal of the outputting unit 150. The outputting unit 150 includes a eighth wavelength selective coupler 151 and a ninth wavelength selective coupler 152.

The eighth wavelength selective coupler 151 has a first port which is connected with a fourth isolator 111 of the first optical fiber amplifying unit 10 and into which the C-band optical signals are inputted, a third port which is connected with a fifth isolator 121 of the second optical fiber amplifying unit 120 and into which the L-band optical signals are inputted, and a second port to which the C- and L-band optical signals inputted into the first and third ports are outputted.

The ninth wavelength selective coupler 152 has a first port which is connected with the second port of the eighth wavelength selective coupler 151 and into which the C- and L-band optical signals are inputted, a third port which is connected with a sixth isolator 131 of the third optical fiber amplifying unit 130 and into which the S-band optical signals are inputted, and a second port to which the C-, L- and S-band optical signals inputted into the first and third ports are outputted.

The first optical fiber amplifying unit 110 is connected with the second terminal of the wavelength band splitting unit 140 and includes a first erbium-doped optical fiber 114, a first wavelength selective coupler 112, a first pumping light source 113 and a fourth isolator 111, so as to amplify the C-band optical signals inputted from the second terminal of the wavelength band splitting unit 140.

The first pumping light source 113 outputs a first pumping light for pumping the first erbium-doped optical fiber 114. The first erbium-doped optical fiber is pumped by the first pumping light, thereby amplifying the C-band optical signals.

The first wavelength selective coupler 112 has a first port that is connected with the second terminal of the wavelength band splitting unit 140, and a second port that is connected with the first erbium-doped optical fiber 114; moreover, a third port is connected with the first pumping light source 113, and outputs both the C-band optical signals inputted into the first port and the first pumping light inputted into the third port, to the second port connected with the first erbium-doped optical fiber 114.

The fourth isolator 111 is connected with the first erbium-doped optical fiber and the first port of the eighth wavelength selective coupler 151, and outputs the C-band optical signals amplified at the first erbium-doped optical fiber 114 to the first port of the eighth wavelength selective coupler 151. Further, the fourth isolator 111 isolates optical signals traveling from the eighth wavelength selective coupler 151 to the first optical fiber amplifying unit 110.

The second optical fiber amplifying unit 120 is connected with the third terminal of the wavelength band splitting unit 140 and amplifies the L-band optical signals inputted from the third terminal of the wavelength band splitting unit 140. The second optical fiber amplifying unit 120 includes a second erbium-doped optical fiber 124, a second wavelength selective coupler 122, a third wavelength selective coupler 125, a second pumping light source 123, a third pumping light source 126 and a fifth isolator 121.

The second pumping light source 123 outputs a forward second pumping light for pumping the second erbium-doped optical fiber 124, while the third pumping light source 126 outputs a backward third pumping light. Both the forward second pumping light and the backward third pumping light are outputted to the second erbium-doped optical fiber 124. The second erbium-doped optical fiber 124 is pumped by the second pumping light and the third pumping light, thus amplifying the L-band optical signals.

The second wavelength selective coupler 122 has a first port that is connected with the third terminal of the wavelength band splitting unit 140, a second port that is connected with the second erbium-doped optical fiber 124, and a third port that is connected with the second pumping light source 123. The second wavelength selective coupler 122 outputs both the L-band optical signals inputted into the first port and the second pumping light inputted into the third port, to the second port.

The fifth isolator 121 outputs the L-band optical signals amplified at the second erbium-doped optical fiber 124 to the third port of the eighth wavelength selective coupler 151. Further, the fifth isolator 121 isolates optical signals traveling from the eighth wavelength selective coupler 151 to the second optical fiber amplifying unit 120.

The third wavelength selective coupler 125 has a first port which is connected with the second erbium-doped optical fiber 124. A second port is connected with the fifth isolator 121, and a third port is connected with the third pumping light source 126, and outputs the L-band optical signals inputted into the first port to the second port and outputs the second pumping light inputted into the third port to the first port.

The third optical fiber amplifying unit 130 is connected with the fourth terminal of the wavelength band splitting unit 140 and amplifies the S-band optical signals inputted from the fourth terminal of the wavelength band splitting unit 140. Further, the third optical fiber amplifying unit 130 includes a thulium-doped optical fiber 134, a fourth wavelength selective coupler 132, a fifth wavelength selective coupler 135, a fourth pumping light source 133, a pumping module 160 and a sixth isolator 131.

The fourth pumping light source 133 outputs forward fourth pumping light for pumping the thulium-doped optical fiber 134, while the pumping module 160 outputs backward fifth pumping light for pumping the thulium-doped optical fiber 134. The fourth pumping light source 133 makes use of a semiconductor laser with the wavelength band of 1050 nm, or the like as its light source.

The pumping module 160 includes seventh and eighth isolators 161 and 165, a tenth wavelength selective coupler 162, a third erbium-doped optical fiber 164, a fifth pumping light source 163 for pumping the third erbium-doped optical fiber 164, and a separate light source 166 capable of emitting light of the wavelength of 1560 nm. Thus, the pumping module 160 amplifies low power light of 1560 nm, which is outputted from the light source 166, at the third erbium-doped optical fiber 164, thereby outputting fifth pumping light having an intensity enough to pump the thulium-doped optical fiber 134. The light source, 166, may be, for example, exemplified by a distributed feedback laser or the like.

The thulium-doped optical fiber is pumped by the fourth and fifth pumping light, thus amplifying the S-band optical signals.

The thulium-doped optical fiber 134 may make use of the wavelength band of 980 nm or 1560 nm as a pumping light source. However, a high power semiconductor laser having the wavelength band of 1560 nm is still not yet available up to date. For this reason, the pumping light source of the wavelength band of 1560 nm outputs light of the wavelength band of 1560 nm by means of the low power distributed feedback laser or the like. In addition, there must be included a separate pumping module, that is provided with an erbium-doped optical fiber for amplifying light outputted from the distributed feedback laser and a pumping light source for pumping the erbium-doped optical fiber.

The fourth wavelength selective coupler 132 has a first port connected with the fourth terminal of the wavelength band splitting unit 140. A second port is then connected with the thulium-doped optical fiber 134 and a third port connected with the fourth pumping light source, and outputs the S-band optical signals and the fourth pumping light, which are inputted into the first and third port respectively, to the second port.

The fifth wavelength selective coupler 135 outputs the S-band optical signals amplified at the thulium-doped optical fiber 134 to the sixth isolator 131 and outputs the fifth pumping light to the thulium-doped optical fiber 134.

The sixth isolator 131 is connected with the second port of the sixth wavelength selective coupler 135, and the third port of the ninth wavelength selective coupler 152. The sixth isolator 131 outputs the S-band optical signals amplified at the thulium-doped optical fiber 134 to the third port of the ninth wavelength selective coupler 152, but isolates optical signals traveling from the ninth wavelength selective coupler 152 to the sixth isolator 131.

However, the conventional wideband optical fiber amplifier as shown in FIG. 1 divides optical signals based on each wavelength band before the optical signals are inputted into each optical fiber amplifying unit, so that the divided respective optical signals are previously subjected to a decrease in intensity before they are inputted into each optical fiber amplifying unit. Further, before the optical signals are inputted into each optical fiber amplifying unit, the optical signals pass through a plurality of components, which are for splitting the optical signals into ones having each wavelength band. Thus, before the optical signals are inputted into each optical fiber amplifying unit, insertion loss of the respective optical signals is greatly increased. Due to the foregoing factors, the conventional wideband optical fiber amplifier has a problem in that its noise figure and amplification efficiency are deteriorated.

SUMMARY OF THE INVENTION

Accordingly, the present invention has been made to overcome the above-mentioned problems and provides additional advantages, by providing a wideband optical fiber amplifier which causes both a noise figure and an amplification efficiency to be improved.

One aspect of the present invention to provide a pumping light source of a thulium-doped optical fiber that is easily integrated in applications and the like.

Another aspect of the present invention is to provide a wideband optical fiber amplifier that c an amplify S-band optical signals, C-band optical signals and L-band optical signals. The amplifier includes: a circulator for outputting optical signals inputted into a first port thereof to a second port thereof and for outputting amplified spontaneous emission (ASE) and the S-band optical signals inputted into the second port thereof to a third port thereof; at least one optical fiber grating for passing the C- and L-band optical signals from among the optical signals outputted from the second port of the circulator, reflecting the S-band optical signals from among the optical signals outputted from the second port of the circulator back to the second port of the circulator, and outputting the ASE inputted into an interior of the optical fiber grating to the second port of the circulator; an outputting unit for outputting optical signals inputted into first to third terminals thereof to a fourth terminal thereof; a wavelength selective splitter for outputting the L-band optical signals of the optical signals inputted into a first port thereof to a second port thereof and for outputting the C-band optical signals of the optical signals inputted into a first port thereof to a third port thereof, the third port of the wavelength selective splitter being connected the second terminal of the outputting unit; a first optical fiber amplifying unit connected with the optical fiber grating and the first port of the wavelength selective splitter, for amplifying the C- and L-band optical signals and for outputting the ASE to the optical fiber grating; a second optical fiber amplifying unit for amplifying the L-band optical signals inputted from the second port of the wavelength selective splitter and for outputting the amplified L-band optical signals to the third terminal of the outputting unit; and, a third optical fiber amplifying unit for amplifying the S-band optical signals inputted from the third port of the circulator and for outputting the amplified S-band optical signals to the first terminal of the outputting unit.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity a detailed description of known functions and configurations incorporated herein will be omitted when they may obscure the subject matter of the present invention.

Figure 1:
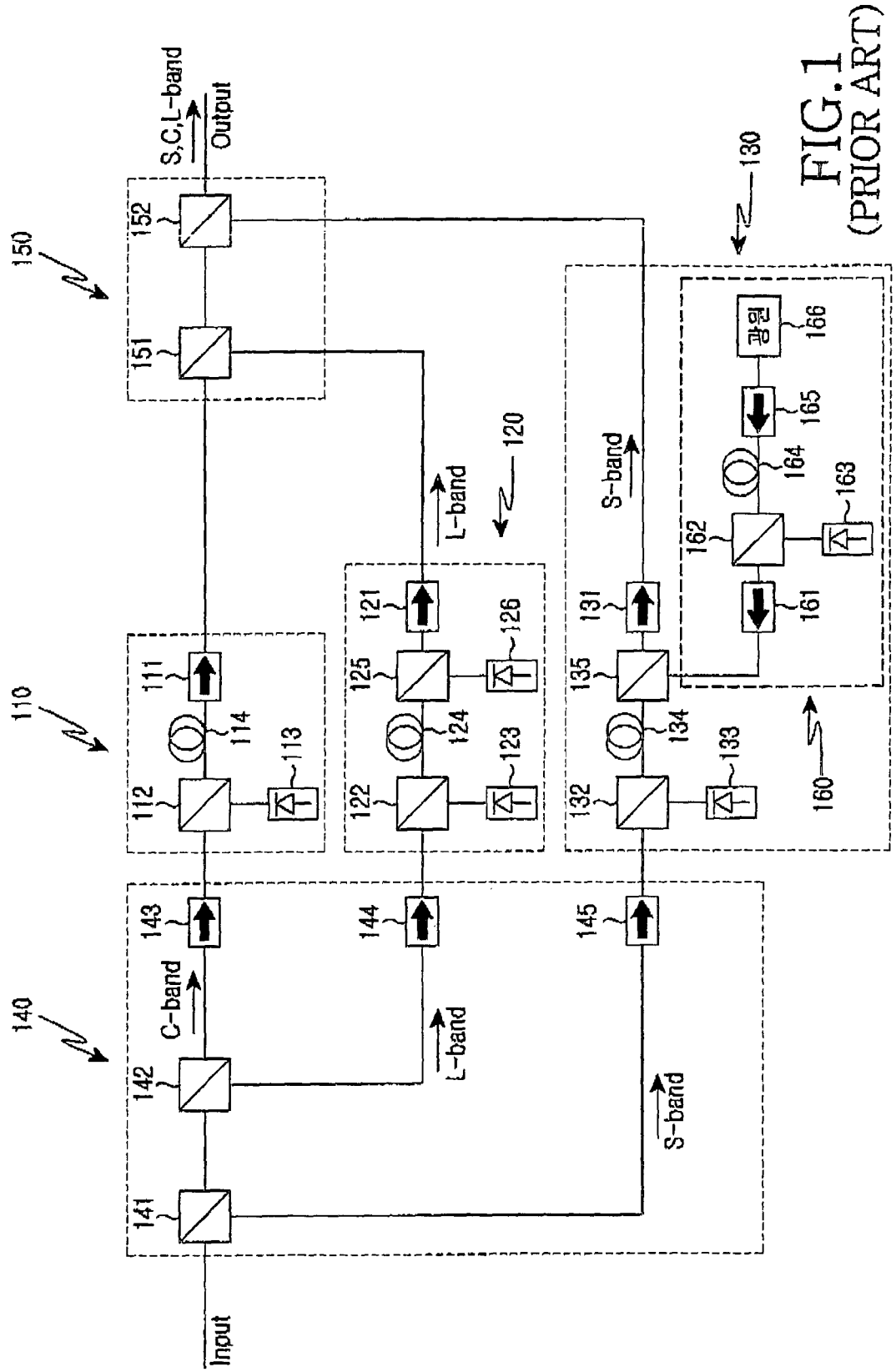
FIG. 1 shows a construction of the conventional wideband optical fiber amplifier, in which each optical fiber amplifying unit is arranged in a parallel form.
Figure 2:
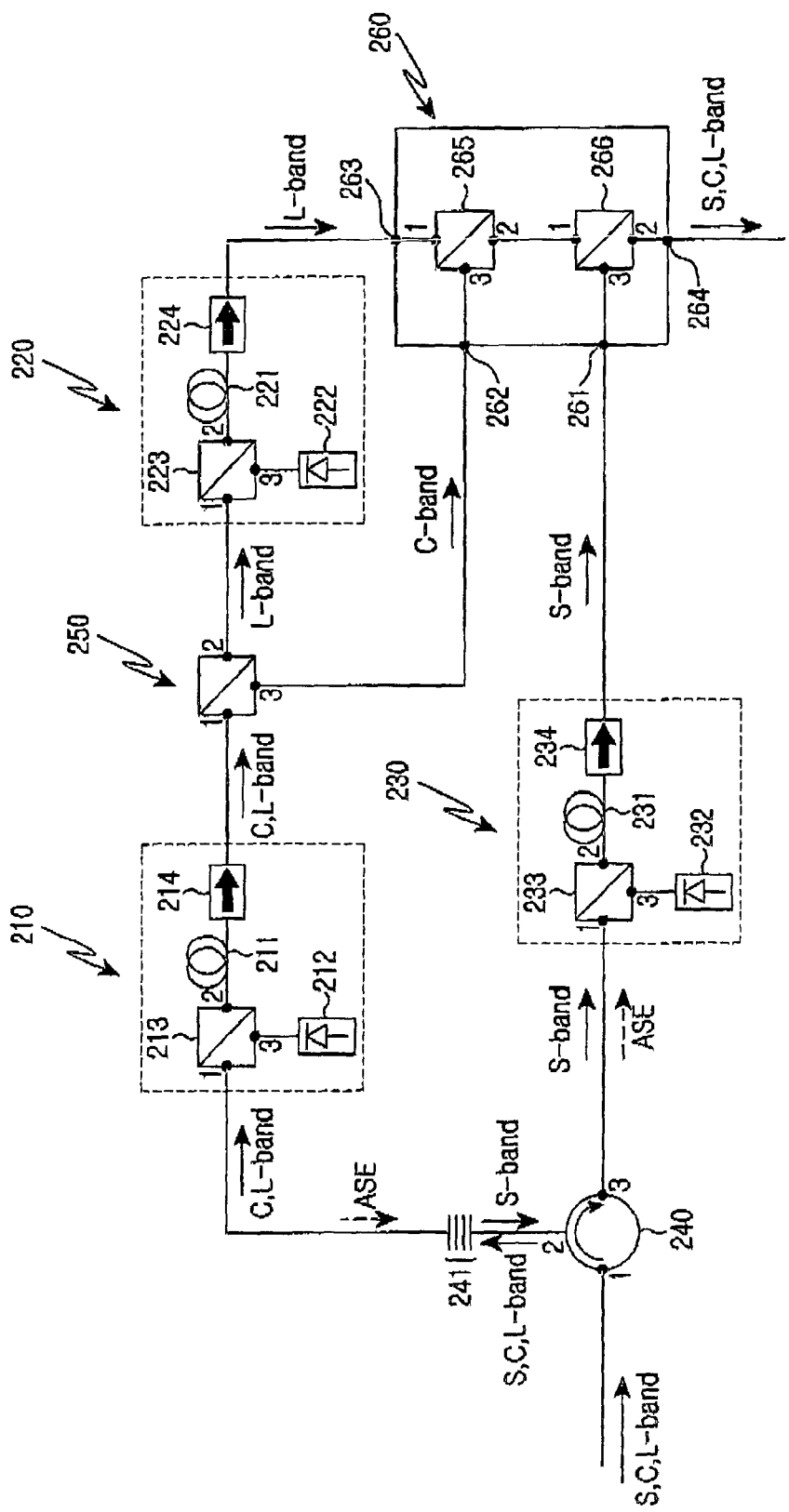
FIG. 2 shows a construction of a wideband optical fiber amplifier according to one embodiment of the present invention.

FIG. 2 shows a construction of a wideband optical fiber amplifier according to a preferred embodiment of the present invention. As shown, the wideband optical fiber amplifier includes a circulator 240, an optical fiber grating 241, an outputting unit 260 for outputting each amplified optical signal to one terminal, a first optical fiber amplifying unit 210 for amplifying C- and L-band optical signals, a second optical fiber amplifying unit 220 for amplifying L-band optical signals, a third optical fiber amplifying unit 230 for amplifying S-band optical signals, and a wavelength selective splitter 250 for coupling the first optical fiber amplifying unit 210 and the second optical fiber amplifying unit 220.

In operation, the circulator 240 outputs the optical signals, which are inputted into a first port thereof, to a second port thereof. Further, the circulator 240 outputs amplified spontaneous emission (SAE) and S-band optical signals, which are inputted into the second port, to a third port thereof. Three kinds of optical signals, that is, S-band optical signals having a wavelength band of 1450 nm, C-band optical signals having a wavelength band of 1550 nm and L-band optical signals having a wavelength band of 1580 nm are inputted into the first port of the circulator 240, and then outputted to the second port of the circulator 240, which is connected with the optical fiber grating 241.

The optical fiber grating 241 passes the C- and L-band ones of the optical signals outputted from the second port of the circulator 240, but reflects the S-band ones back to the second port of the circulator 240. Further, the optical fiber grating 241 outputs the ASE inputted into itself to the second port of the circulator 240.

The wideband optical fiber amplifier according to the present invention is designed to minimize a path for splitting optical signals to be amplified according to each wavelength band Thus the wideband optical fiber amplifier thereby minimizes the number of components through which the respective split optical signals must pass before being inputted into the respective optical fiber amplifying units 210, 220 and 230. This means an increase in intensity. To rephrase, there is an advantage in that the insertion loss generated before the optical signals are inputted into respective optical fiber amplifying units can be minimized by minimizing the number of components for splitting optical signals according to each wavelength band. Furthermore, there is another advantage in that production costs can be saved by shortening a time for production and assembly processes and by reducing the number of components.

The wavelength selective splitter 250 is interposed between the first optical fiber amplifying unit 210. The second optical fiber amplifying unit 220 and is provided with first, second and third ports, in which among optical signals inputted into the first port, L-band ones are outputted to the second port, and C-band ones are outputted to the third port.

The first optical fiber amplifying unit 210 includes a first erbium-doped optical fiber 211, a first pumping light source 212, a first wavelength selective coupler 213 and a first isolator 214. The first optical fiber amplifying unit 210 is arranged between the optical fiber grating 241 and the wavelength selective splitter 250. Thus, the first optical fiber amplifying unit 210 amplifies the C- and L-band optical signals inputted into the first wavelength selective coupler 213 at the first erbium-doped optical fiber 211, and outputs C-band ASE having a wavelength band of 1560 nm, which are generated when amplifying the C- and L-band optical signals at the first erbium-doped optical fiber 211, to the optical fiber grating 241.

The first erbium-doped optical fiber 211 amplifies the C- and L-band optical signals inputted from the second port of the first wavelength selective coupler 213 into its interior, and outputs ASE to the second port of the first wavelength selective coupler 213. The first pumping light source 212 outputs first pumping light in order to pump optical fiber 211.

The first wavelength selective coupler 213 has a first port connected to the optical fiber grating 241. Consequently, a second port is connected to the first erbium-doped optical fiber 211 and a third port connected to the first pumping light source 212, so that the C- and L-band optical signals inputted into the first port and first pumping light inputted into the third port are outputted to the second port, and the ASE inputted into the second port are outputted to the first port.

The first isolator 214 is connected with the first erbium-doped optical fiber 211 and the wavelength selective splitter 250. The first isolator 214 outputs the C- and L-band optical signals to the first port of the wavelength selective splitter 250, but however serves to isolate optical signals inputted from the wavelength selective splitter 250 to the first optical fiber amplifying unit 210.

The second optical fiber amplifying unit 220 includes a second erbium-doped optical fiber 221 for amplifying L-band optical signals, a second pumping light source 222 for outputting second pumping light, a second wavelength selective coupler 223 interposed between the second port of the wavelength selective splitter 250 and the second erbium-doped optical fiber 221, and a second isolator 224 connected with the second erbium-doped optical fiber 221 and a third terminal of the outputting unit 260.

The second pumping light source 222 outputs second pumping light for pumping the second erbium-doped optical fiber 221, and amplifies L-band optical signals by pumping of the second erbium-doped optical fiber 221 by the second pumping light.

The second wavelength selective coupler 223 has a first port connected to the second port of the wavelength selective splitter 250, a second port connected to the second erbium-doped optical fiber 221 and a third port connected to the second pumping light source 222, so that the L-band optical signals inputted into the first port of the second wavelength selective coupler 213 and the second pumping light inputted into the third port of the second wavelength selective coupler 213 are outputted to the second port of the second wavelength selective coupler 213.

The second isolator 224 is connected with the second erbium-doped optical fiber 221 and the third terminal 263 of the outputting unit 260. Thus, the second isolator 224 outputs the L-band optical signals amplified at the second erbium-doped optical fiber 221 to the outputting unit 260, but isolates optical signals inputted from the outputting unit 260 to the second optical fiber amplifying unit 220.

The present invention can minimize paths into which optical signals are split prior to inputting into respective optical fiber amplifying units by serial connection of a primary optical fiber amplifying unit for amplifying C- and L-band optical signals with a secondary optical fiber amplifying unit for amplifying L-band optical signals. In other words, the wideband optical fiber amplifier according to the present invention has an advantage in that it minimizes the intensity loss of the respective optical signals by splitting them for two paths, one for the C- and L-band optical signals and the other for the S-band optical signals.

The third optical fiber amplifying unit 230 includes a thulium-doped optical fiber 231 for amplifying S-band optical signals, a third pumping light source 232 for outputting third pumping light, a third wavelength selective coupler 233 interposed between the third port of the circulator 240 and the thulium-doped optical fiber 231, and a third isolator 234 for isolating optical signals inputted from the first terminal of the outputting unit 260 to the third optical fiber amplifying unit 230.

The third pumping light source 232 outputs third pumping light for pumping the thulium-doped optical fiber 231. In addition, the third pumping light source 232 makes use of a semiconductor laser having a wavelength of 980 nm, or a similar length.

The thulium-doped optical fiber 231 is pumped by the ASE of 1560 nm outputted from the first erbium-doped optical fiber 211 and the third pumping light outputted from the third pumping light source 232, thereby amplifying S-band optical signals. The ASE for pumping thulium-doped optical fiber 231 have a wavelength of 1560 nm.

In the prior art, when the optical fiber amplifying unit for outputting light of 1560 nm with use of the distributed feedback laser is used as the light source for pumping the thulium-doped optical fiber, there is a resultant problem. Namely, it is not easy to integrate the wideband optical fiber amplifier because the optical fiber amplifying unit, which further comprises the light source capable of outputting separate light of 1560 nm, is provided as the pumping light source. By contrast, in the present invention, there is an advantage in that, by utilizing the ASE having C-band generating from the interior of the wideband optical fiber amplifier as the pumping light of the thulium-doped optical fiber, a construction becomes simple and integration of system is possible.

The third wavelength selective coupler 233 has a first port connected to the third port of the circulator 240, a second port connected to the thulium-doped optical fiber 231. The third port connected to the third pumping light source 232, so that the ASE and S-band optical signals inputted into the first port of the third wavelength selective coupler 233 and the third pumping light inputted into the third port of the third wavelength selective coupler 233 are outputted to the second port of the third wavelength selective coupler 233.

The third isolator 234 is connected with the thulium-doped optical fiber 231 and the first terminal 261 of the outputting unit 260. Thus, the third isolator 234 outputs the S-band optical signals amplified at the third optical fiber amplifying unit 230 to the outputting unit 260, but isolates optical signals inputted from the outputting unit 260 to the third optical fiber amplifying unit 230.

The outputting unit 260 has a first terminal 261 connected to the third optical fiber amplifying unit 230 A second terminal 262 connected to the third port of the wavelength selective splitter 250. Finally a third terminal 263 is connected to the second optical fiber amplifying unit 220, so that C-, S- and L-band optical signals inputted into the first, second and third terminals 261, 262 and 263 are outputted to a fourth terminal 264 of the outputting unit 260. The outputting unit 260 includes a fourth wavelength selective coupler 265 and a fifth wavelength selective coupler 266.

The fourth wavelength selective coupler 265 has a first port connected to the third terminal 263 of the outputting unit 260, a second port connected to the fifth wavelength selective coupler 266 and a third port connected to the second terminal 262 of the outputting unit 260, so that the L-band optical signals inputted into the first port of the fourth wavelength selective coupler 265 and the C-band optical signals inputted into the third port of the fourth wavelength selective coupler 265 are outputted to the second port of the fourth wavelength selective coupler 265.

The fifth wavelength selective coupler 266 has a first port connected to the second port of the fourth wavelength selective coupler 265, a second port connected to the fourth terminal 264 of the outputting unit 260 and a third port connected to the first terminal 261 of the outputting unit 260, so that the C- and L-band optical signals inputted into the first port of the fifth wavelength selective coupler 266 and the S-band optical signals inputted into the second port of the fifth wavelength selective coupler 266 are outputted to the third port of the fifth wavelength selective coupler 266.

Figure 3:
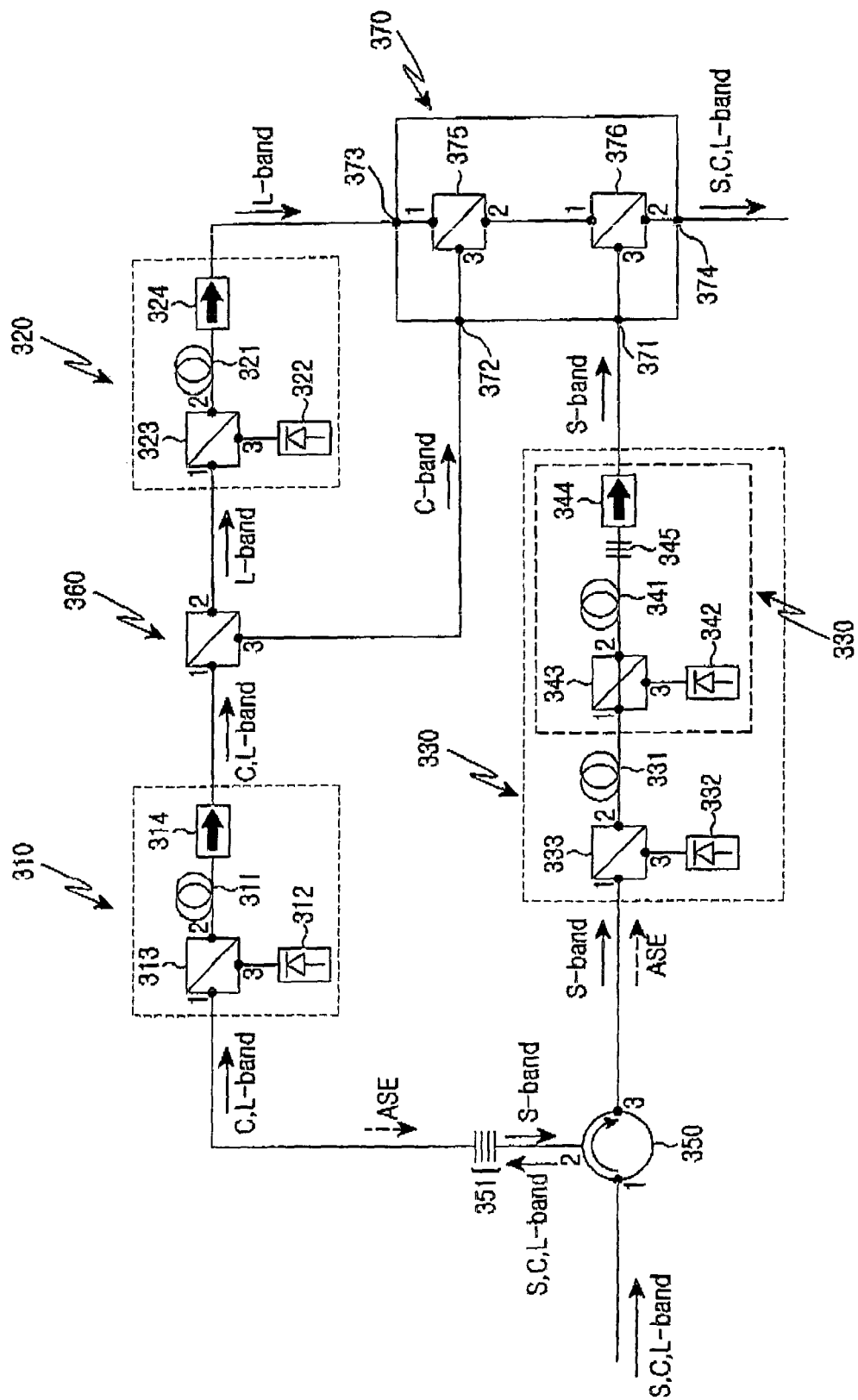
FIG. 3 shows a construction of a wideband optical fiber amplifier according to another embodiment of the present invention, in which the wideband optical fiber amplifier further comprises a separate pumping module.

FIG. 3 shows a construction of a wideband optical fiber amplifier further comprising a pumping module for outputting pumping light for pumping a separate thulium-doped optical fiber in accordance with another embodiment of the present invention.

Referring to FIG. 3, the wideband optical fiber amplifier according to another embodiment of the present invention includes a circulator 350, an optical fiber grating 351, an outputting unit 370 for outputting respective amplified optical signals to one terminal, a first optical fiber amplifying unit 310 for amplifying C- and L-band optical signals, a second optical fiber amplifying unit 320 for amplifying L-band optical signals, third optical fiber amplifying unit 330 for amplifying S-band optical signals, and a wavelength selective splitter 360 for coupling the first optical fiber amplifying unit 310 and the second optical fiber amplifying unit 320.

The circulator 350 outputs the optical signals that are inputted into a first port thereof to a second port. Further, the circulator 350 outputs amplified spontaneous emission (ASE) and S-band optical signals, which are inputted into its own second port, to its own third port. Three kinds of optical signals, that is, S-band optical signals having a wavelength band of 1450 nm, C-band optical signals having a wavelength band of 1550 nm and L-band optical signals having a wavelength band of 1580 nm are inputted into the first port of the circulator 350, and then outputted to the second port of the circulator 350, which is connected with the optical fiber grating 351.

The optical fiber grating 351 passes the C- and L-band ones of the optical signals outputted from the second port of the circulator 350, but reflects the S-band ones back to the second port of the circulator 350. Further, the optical fiber grating 351 outputs the ASE, which have been inputted into itself, to the second port of the circulator 350.

The wavelength selective splitter 360 is interposed between the first optical fiber amplifying unit 310 and the second optical fiber amplifying unit 320. The wavelength selective splitter 360 outputs L-band ones of optical signals inputted into its own first port to its own second port, and outputs C-band ones to its own third port.

The first optical fiber amplifying unit 310 includes a first erbium-doped optical fiber 311, a first pumping light source 312, a first wavelength selective coupler 313 and a first isolator 314. The first optical fiber amplifying unit 310 connects the optical fiber grating 351 with the first port of the wavelength selective splitter 360. Thus, the first optical fiber amplifying unit 310 amplifies the C- and L-band optical signals inputted into its interior, and outputs ASE to the optical fiber grating 351.

The second optical fiber amplifying unit 320 includes a second erbium-doped optical fiber 321 for amplifying L-band optical signals inputted into its interior, a second pumping light source 322 for outputting second pumping light for pumping the second erbium-doped optical fiber 321, a second wavelength selective coupler 323 interposed between the second port of the wavelength selective splitter 360 and the second erbium-doped optical fiber 321, and a second isolator 324 for outputting L-band optical signals, which are amplified at the second erbium-doped optical fiber 321, to a third terminal of the outputting unit 370 and for isolating optical signals inputted from the outputting unit 370 to its interior.

The third optical fiber amplifying unit 330 includes a thulium-doped optical fiber 331 for amplifying S-band optical signals, a third pumping light source 332 for outputting third pumping light, a third wavelength selective coupler 333 interposed between the third port of the circulator 350 and the thulium-doped optical fiber 331, and a pumping module 340 for outputting backward fifth pumping light for pumping the thulium-doped optical fiber 331.

The thulium-doped optical fiber 331 is connected to the second port of the third wavelength selective coupler 333 and the pumping module 340. The thulium-doped optical fiber 331 is pumped by the ASE and the third pumping light inputted from the third wavelength selective coupler 333 and by the fifth pumping light, thereby amplifying S-band optical signals inputted into the interior of the thulium-doped optical fiber 331.

The third wavelength selective coupler 333 has a first port connected to the third port of the circulator 350, a second port connected to the thulium-doped optical fiber 331 and a third port connected to the third pumping light source 332, so that the ASE and S-band optical signals inputted into the first port of the third wavelength selective coupler 333 and the third pumping light inputted into the third port of the third wavelength selective coupler 333 are outputted to the thulium-doped optical fiber 331 through the second port of the third wavelength selective coupler 333.

The third pumping light source 332 makes use of a semiconductor laser or the like, which can output forward pumping light of 980 nm for pumping the thulium-doped optical fiber 331.

The pumping module 340 is positioned between one end of the thulium-doped optical fiber 331 and one terminal of the outputting unit 370. The pumping module 340 outputs fifth pumping light, which amplifies the ASE generated at its interior, to the thulium-doped optical fiber 331. The pumping module 340 includes a fourth wavelength selective coupler 343, a fourth erbium-doped optical fiber 341 for amplifying the ASE generated at its interior, a fourth pumping light source 342 for outputting fourth pumping light for pumping the fourth erbium-doped optical fiber 341, a third isolator 344 for outputting the S-band optical signals to the outputting unit 370 and isolating optical signals inputted from the outputting unit 370 to the third optical fiber amplifying unit 330, and an optical fiber grating 345.

The fourth wavelength selective coupler 343 has a first port connected to the thulium-doped optical fiber 331, a second port connected to the third erbium-doped optical fiber 341, and a third port connected to the fourth pumping light source 342. The fourth wavelength selective coupler 343 outputs fifth pumping light having a wavelength of 1560 nm, which amplifies the ASE generated from the third erbium-doped optical fiber 341, to the first port of the fourth wavelength selective coupler 343.

The fourth pumping light source 342 makes use of a semiconductor laser or the like capable of outputting fourth pumping light for pumping the third erbium-doped optical fiber 341, and is connected to the third port of the fourth wavelength selective coupler 343.

The third erbium-doped optical fiber 341 is connected with the second port of the fourth wavelength selective coupler 343 and the optical fiber grating 345. The third fiber 341 outputs the ASE, which is generated from its interior, to the optical fiber grating 345. The optical fiber grating 345 reflects the ASE outputted from the third erbium-doped optical fiber 341 back to the third erbium-doped optical fiber 341. The ASE reflected at the optical fiber grating 345 is amplified to the fifth pumping light at the third erbium-doped optical fiber 341, and then outputted to the second port of the fourth wavelength selective coupler 343. The fifth pumping light, as the ASE of 1560 nm outputted from the third erbium-doped optical fiber 341, amplifies the thulium-doped optical fiber 331.

The optical fiber grating 345 is connected to the third erbium-doped optical fiber 341 and the third isolator 344, and reflects the ASE outputted from the third erbium-doped optical fiber 341 back to the third erbium-doped optical fiber 341.

To sum up, the present invention has an advantage in that the ASE outputted from the first optical fiber amplifying unit and the fifth pumping light of 1560 nm amplified at the pumping module are used as the pumping light for pumping the thulium-doped optical fiber, so that it is possible to construct the wideband optical fiber amplifier without a separate light source. In other words, there is an advantage in that, because a separate light source is not needed, it is easy to integrate the pumping module, and thus production costs of the pumping module is decreased.

The outputting unit 370 has a first terminal 371 connected with the third optical fiber amplifying unit 330. A second terminal 372 is connected with the third port of the wavelength selective splitter 360, a third terminal 373 is connected to the second optical fiber amplifying unit 320, and a fourth terminal 374. The outputting unit 370 causes the L-band optical signals inputted into the third terminal 373, the C-band optical signals inputted into the second terminal 372 and the S-band optical signals inputted into the first terminal 371 to be outputted to the fourth terminal 374. The outputting unit 371 includes a fifth wavelength selective coupler 375 and a sixth wavelength selective coupler 376.

The fifth wavelength selective coupler 375 has a first port connected to the third terminal 373 of the outputting unit 370, a second port connected to a first port of the sixth wavelength selective coupler 376 and a third port connected to the second terminal 372 of the outputting unit 370. The sixth wavelength selective coupler 376 has a first port connected to the second port of the fifth wavelength selective coupler 375, a second port connected to the fourth terminal 374 of the outputting unit 370 and a third port connected to the first terminal 371 of the outputting unit 370.

Thus, the L-band optical signals inputted into the first port of the fifth wavelength selective coupler 375 and the C-band optical signals inputted into the third port of the fifth wavelength selective coupler 375 are outputted to the second port of the fifth wavelength selective coupler 375, and then inputted into the first port of the sixth wavelength selective coupler 376. The sixth wavelength selective coupler 376 allows the C- and L-band optical signals inputted into its own first port and the S-band optical signals inputted into its own third port to be outputted to its own second port.

The present invention has an advantage in that, before the optical signals are inputted into respective optical fiber amplifying units, by minimizing splitting paths of the optical signals as well as components for splitting the optical signals with use of one circulator and at least one optical fiber grating, an intensity loss and a noise figure, which are generated before the optical signals are inputted, are reduced. Further, it has another advantage in that, by using ASE having the wavelength of 1560 nm generated from the interior of each optical fiber amplifying unit as a pumping light source of a thulium-doped optical fiber, it is possible to perform integration as well as to save production costs.

What is claimed is:

1. A wideband optical fiber amplifier configured for amplifying S-band optical signals, C-band optical signals and L-band optical signals, said amplifier comprising:

a circulator having first, second, and third ports, said circulator outputting a plurality of optical signals into said second port that were input into the first port, and said circulator also outputting an amplified spontaneous emission (ASE) and S-band optical signals to a third port that were input into said second port of said circulator;

at least one optical fiber grating for passing the C- and L-band optical signals from among the plurality of optical signals outputted from the second port of the circulator configured for reflecting the S-band optical signals from among the optical signals outputted from the second port of the circulator back to the second port of the circulator, and outputting the ASE inputted into an interior of the optical fiber grating to the second port of the circulator;

an outputting unit having at least four terminals configured for outputting optical signals inputted into first to third terminals to a fourth terminal;

a wavelength selective splitter having first, second and third ports configured for being connected the second terminal of the outputting unit;

outputting the L-band optical signals of the optical signals inputted into said first port to the second port of the splitter and configured for the C-band optical signals of the optical signals inputted into a first port to the third port, the third port of the wavelength selective splitter a first optical fiber amplifying unit connected with the optical fiber grating and the first port of the wavelength selective splitter, configured for amplifying the C- and L-band optical signals and for outputting the ASE to the optical fiber grating;

a second optical fiber amplifying unit configured for the L-band optical signals inputted from the second port of the wavelength selective splitter and for outputting the amplified L-band optical signals to the third terminal of the outputting unit; and a third optical fiber amplifying unit configured for the S-band optical signals inputted from the third port of the circulator and for outputting the amplified S-band optical signals to the first terminal of the outputting unit.

2. A wideband optical fiber amplifier according to claim 1, wherein the first optical fiber amplifying unit comprises:

a first erbium-doped optical fiber for amplifying the C- and L-band optical signals and for outputting C-band ASE;

a first pumping light source for outputting first pumping light for pumping the first erbium-doped optical fiber;

a first wavelength selective coupler having a first, second and third for outputting the C- and L-band optical signals inputted into a first port and the first pumping light inputted into a third port to a second port and for outputting the C-band ASE inputted into the second port to the first port the first port of the first wavelength selective coupler being connected to the optical fiber grating, the second port of the first wavelength selective coupler being connected to the first erbium-doped optical fiber, the third port of the first wavelength selective coupler being connected to the first pumping light source; and a first isolator connected with the first erbium-doped optical fiber and the first port of the wavelength selective splitter, for outputting the C- and L-band optical signals to the first port of the wavelength selective splitter and for isolating optical signals inputted from the wavelength selective splitter to the first optical fiber amplifying unit.

3. A wideband optical fiber amplifier according to claim 1, wherein the first erbium-doped optical fiber outputs C-band ASE having a wavelength band of 1560 nm in order to pump the third optical fiber amplifying unit.

4. A wideband optical fiber amplifier according to claim 2, wherein the first erbium-doped optical fiber outputs C-band ASE having a wavelength band of 1560 nm in order to pump the third optical fiber amplifying unit.

5. A wideband optical fiber amplifier according to claim 4, wherein the second optical fiber amplifying unit comprises:

a second erbium-doped optical fiber for amplifying the L-band optical signals;

a second pumping light source for outputting second pumping light for pumping the second erbium-doped optical fiber;

a second wavelength selective coupler for outputting the L-band optical signals inputted into a first port thereof and the second pumping light inputted into a third port thereof to a second port thereof, the first port of the second wavelength selective coupler being connected to the second port of the wavelength selective splitter, the second port of the second wavelength selective coupler being connected to the second erbium-doped optical fiber, the third port of the second wavelength selective coupler being connected to the second pumping light source; and a second isolator connected with the second erbium-doped optical fiber and the third terminal of the outputting unit, for outputting the amplified L-band optical signals to the third terminal of the outputting unit and for isolating optical signals inputted from the outputting unit to the second optical fiber amplifying unit.

6. A wideband optical fiber amplifier according to claim 1, wherein the outputting unit comprises:

a fourth wavelength selective coupler having first, second and third ports for outputting the L-band optical signals inputted into a first port and the C-band optical signals inputted into a third port to a second port, the first port of the fourth wavelength selective coupler being connected to the second optical fiber amplifying unit, the third port of the fourth wavelength selective coupler being connected to the third port of the wavelength selective splitter; and a fifth wavelength selective coupler having at least a first, second and third port-for outputting the S-band optical signals inputted into a third port and the C- and L-band optical signals inputted into a first port to a second port, the first port of the fifth wavelength selective coupler being connected to the first port of the fourth wavelength selective coupler, the third port of the fifth wavelength selective coupler being connected to the third optical fiber amplifying unit.

7. A wideband optical fiber amplifier according to claim 3, wherein the third optical fiber amplifying unit comprises:

a thulium-doped optical fiber pumped by the ASE and third pumping light to amplify the S-band optical signals;

a third pumping light source for outputting third pumping light for pumping the thulium-doped optical fiber;

a third wavelength selective coupler having at least first, second and third port for outputting the ASE and S-band optical signals inputted into a first port and the third pumping light inputted into a third port to a second port, the first port of the third wavelength selective coupler being connected to the third port of the circulator, the second port of the third wavelength selective coupler being connected to the thulium-doped optical fiber, the third port of the third wavelength selective coupler being connected to the third pumping light source; and a third isolator for outputting the S-band optical signals amplified at the thulium-doped optical fiber to the first terminal of the outputting unit and for isolating optical signals inputted from the outputting unit to the third optical fiber amplifying unit.

8. A wideband optical fiber amplifier according to claim 7, wherein the third optical fiber amplifying unit further comprises a pumping module for outputting fifth pumping light for pumping the thulium-doped optical fiber.

9. A wideband optical fiber amplifier according to claim 6, wherein the pumping module comprises:

a fourth pumping light source for outputting fourth pumping light;

a third erbium-doped optical fiber pumped by the fourth pumping light to amplify fifth pumping light;

a sixth wavelength selective coupler for outputting the S-band optical signals inputted into a first port thereof and the fourth pumping light inputted into a third port thereof to a second port thereof, and for outputting the fifth pumping light inputted from the third erbium-doped optical fiber to the second port thereof to the thulium-doped optical fiber, the first port of the sixth wavelength selective coupler being connected to the thulium-doped optical fiber, the second port of the sixth wavelength selective coupler being connected to the third erbium-doped optical fiber, the third port of the sixth wavelength selective coupler being connected to the fourth pumping light source;

a third isolator for outputting the S-band optical signals inputted into an interior thereof to the first terminal of the outputting unit and for isolating optical signals inputted from the outputting unit to the third optical fiber amplifying unit; and an optical fiber grating for outputting the S-band optical signals from among the S-band optical signals and the fifth pumping light to the third isolator and for reflecting the fifth pumping light from among the S-band optical signals and the fifth pumping light back to the third erbium-doped optical fiber, the S-band optical signals and the fifth pumping light being inputted into one end connected to the third erbium-doped optical fiber.

10. A wideband optical fiber amplifier according to claim 7, wherein the pumping module comprises:

a fourth pumping light source for outputting fourth pumping light;

a third erbium-doped optical fiber pumped by the fourth pumping light to amplify fifth pumping light;

a sixth wavelength selective coupler for outputting the S-band optical signals inputted into a first port thereof and the fourth pumping light inputted into a third port thereof to a second port thereof, and for outputting the fifth pumping light inputted from he third erbium-doped optical fiber to the second port thereof to the thulium-doped optical fiber, the first port of the sixth wavelength selective coupler being connected to the thulium-doped optical fiber, the second port of the sixth wavelength selective coupler being connected to the third erbium-doped optical fiber, the third port of the sixth wavelength selective coupler being connected to the fourth pumping light source;

a third isolator for outputting the S-band optical signals inputted into an interior thereof to the first terminal of the outputting unit and for isolating optical signals inputted from the outputting unit to the third optical fiber amplifying unit; and an optical fiber grating for outputting the S-band optical signals from among the S-band optical signals and the fifth pumping light to the third isolator and for reflecting the fifth pumping light from among the S-band optical signals and the fifth pumping light back to the third erbium-doped optical fiber, the S-band optical signals and the fifth pumping light being inputted into one end connected to the third erbium-doped optical fiber.

11. A wideband optical fiber amplifier according to claim 10, wherein the third erbium-doped optical fiber is pumped by the fourth pumping light to output the ASE as the fifth pumping light, and amplifies the fifth pumping light reflected at the optical fiber grating to output the second port of the sixth wavelength selective coupler.

12. A wideband optical fiber amplifier according to claim 10, wherein the optical fiber grating includes a Bragg grating on the optical fiber, the Bragg grating having a predetermined period for reflecting the fifth pumping light outputted from the third erbium-doped optical fiber back to the third erbium-doped optical fiber.

13. A wideband optical fiber amplifier according to claim 8, wherein the third pumping light source outputs the third pumping light having a wavelength of 980 nm.

14. A wideband optical fiber amplifier according to claim 10, wherein the third erbium-doped optical fiber outputs the fifth pumping light having a wavelength of 1560 nm.

* * * * *